(12) United States Patent
Zhang

(10) Patent No.: US 9,547,206 B2
(45) Date of Patent: Jan. 17, 2017

(54) MULTIPLE GLAZING WITH VARIABLE DIFFUSION BY LIQUID CRYSTALS

(71) Applicant: CARDINAL IG COMPANY, Eden Prairie, MN (US)

(72) Inventor: Jingwei Zhang, Massy (FR)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 14/369,560

(22) PCT Filed: Dec. 26, 2012

(86) PCT No.: PCT/FR2012/053083
§ 371 (c)(1),
(2) Date: Jun. 27, 2014

(87) PCT Pub. No.: WO2013/098522
PCT Pub. Date: Jul. 4, 2013

(65) Prior Publication Data
US 2015/0116638 A1    Apr. 30, 2015

(30) Foreign Application Priority Data
Dec. 29, 2011 (FR) ...................... 11 62549

(51) Int. Cl.
*G02F 1/1345* (2006.01)
*G02F 1/1334* (2006.01)
(Continued)

(52) U.S. Cl.
CPC ..... *G02F 1/13452* (2013.01); *B32B 17/10174* (2013.01); *B32B 17/10504* (2013.01); *G02F 1/1334* (2013.01); *G02F 1/13718* (2013.01)

(58) Field of Classification Search
CPC .................. G02F 1/1334; G02F 1/13452
(Continued)

(56) References Cited

U.S. PATENT DOCUMENTS

| 4,566,758 A | 1/1986 | Bos |
| 4,837,745 A | 6/1989 | Eich et al. |

(Continued)

FOREIGN PATENT DOCUMENTS

| CN | 1701265 A | 11/2005 |
| CN | 101297340 A | 10/2008 |

(Continued)

OTHER PUBLICATIONS

PCT/FR2012/053083, International Preliminary Report on Patentability dated Jul. 10, 2014, 16 pages (including both French Language version and English Language translation).

(Continued)

*Primary Examiner* — Thanh-Nhan P Nguyen
(74) *Attorney, Agent, or Firm* — Fredrikson & Byron, P.A.

(57) ABSTRACT

A liquid-crystal multiple glazing can have a first glass sheet and a second glass sheet held by a gasket referred to as the contact gasket. In some examples, the multiple glazing includes first and second electrodes with first and second electricity supply zones and a liquid-crystal layer with spacers having a thickness of between 5 and 15 µm. Additionally, the first glass sheet may protrude by a first protruding side and include the first electricity supply zone. Further, the glazing may have electrical cabling with a first cabling input with a first electrically insulating polymer material.

18 Claims, 7 Drawing Sheets

Figure 1A:
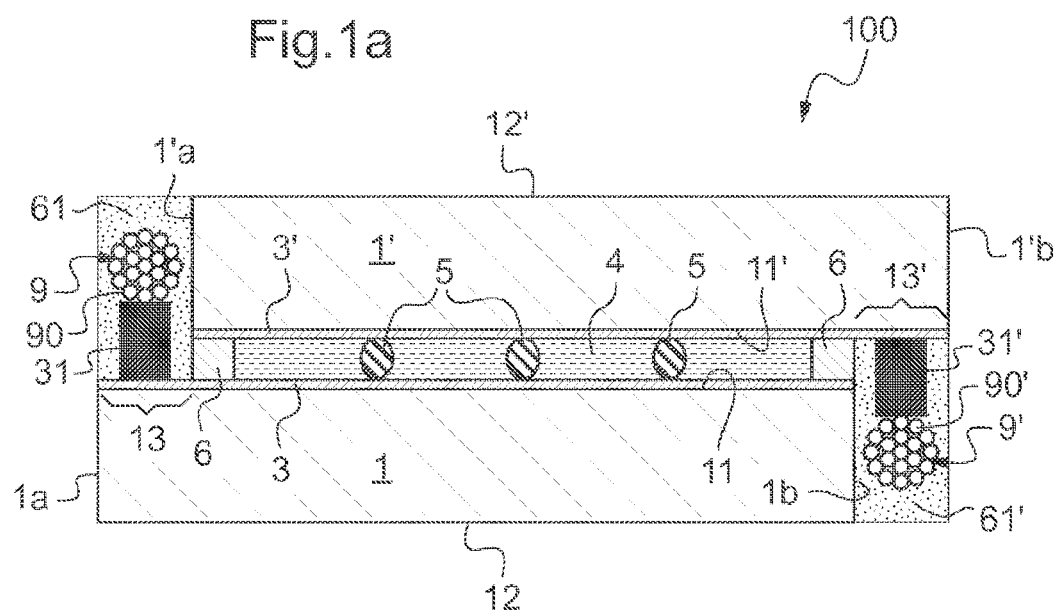

(51) Int. Cl.
*G02F 1/137* (2006.01)
*B32B 17/10* (2006.01)

(58) Field of Classification Search
USPC .................................................. 349/86, 152
See application file for complete search history.

(56) References Cited

U.S. PATENT DOCUMENTS

| | | | |
|---|---|---|---|
| 5,142,644 A * | 8/1992 | VanSteenkiste | .... G02F 1/13452 |
| | | | 349/152 |
| 5,408,353 A | 4/1995 | Nichols et al. | |
| 5,427,828 A * | 6/1995 | Park | ....................... C09K 19/36 |
| | | | 349/183 |
| 5,680,185 A | 10/1997 | Kobayashi et al. | |
| 5,686,017 A | 11/1997 | Kobayashi et al. | |
| 5,691,795 A | 11/1997 | Doane et al. | |
| 5,889,608 A | 3/1999 | Buffat et al. | |
| 5,958,290 A | 9/1999 | Coates et al. | |
| 6,271,899 B1 | 8/2001 | Lewis et al. | |
| 6,295,102 B1 | 9/2001 | Higa et al. | |
| 6,429,961 B1 | 8/2002 | Harary et al. | |
| 6,661,486 B1 | 12/2003 | Faris et al. | |
| 7,342,704 B2 | 3/2008 | Yano | |
| 7,525,604 B2 | 4/2009 | Xue | |
| 7,755,829 B2 | 7/2010 | Powers et al. | |
| 7,837,897 B2 | 11/2010 | Zhang et al. | |
| 8,102,478 B2 | 1/2012 | Xue | |
| 8,187,682 B2 | 5/2012 | Albrecht et al. | |
| 2001/0033400 A1 | 10/2001 | Sutherland et al. | |
| 2002/0012160 A1 | 1/2002 | Kase et al. | |
| 2003/0193709 A1 | 10/2003 | Mallya et al. | |
| 2004/0053125 A1 | 3/2004 | Giron et al. | |
| 2004/0160538 A1 | 8/2004 | Li et al. | |
| 2005/0190331 A1 | 9/2005 | Yano | |
| 2005/0190332 A1 | 9/2005 | Yano | |
| 2009/0068455 A1 | 3/2009 | Albrecht et al. | |
| 2009/0103027 A1 | 4/2009 | Hughes et al. | |
| 2009/0115942 A1 | 5/2009 | Watanabe | |
| 2009/0219603 A1 | 9/2009 | Xue | |
| 2009/0290078 A1 | 11/2009 | Yang et al. | |
| 2010/0105276 A1 | 4/2010 | Yoshida | |
| 2010/0118380 A1 | 5/2010 | Xue | |
| 2010/0279125 A1 | 11/2010 | Buyuktanir et al. | |
| 2010/0294679 A1 | 11/2010 | Griffiths et al. | |
| 2011/0102730 A1 | 5/2011 | Lee et al. | |
| 2013/0093969 A1 | 4/2013 | Li et al. | |
| 2013/0141656 A1 | 6/2013 | Kujawa et al. | |
| 2013/0265511 A1* | 10/2013 | Poix | .................. B32B 17/10045 |
| | | | 349/33 |

FOREIGN PATENT DOCUMENTS

| | | |
|---|---|---|
| DE | 3402518 A1 | 8/1985 |
| EP | 0575207 A1 | 12/1993 |
| EP | 0835743 A2 | 4/1998 |
| EP | 2093051 A1 | 8/2009 |
| EP | 2128688 A1 | 12/2009 |
| EP | 2256545 B1 | 11/2013 |
| GB | 2296479 A | 7/1996 |
| JP | H01075218 U | 5/1989 |
| JP | H02029023 U | 2/1990 |
| JP | H02-79818 A | 3/1990 |
| JP | H02062518 U | 5/1990 |
| JP | H02219025 A | 8/1990 |
| JP | H06-167700 A | 6/1994 |
| JP | H07069047 A | 3/1995 |
| JP | H10175220 A | 6/1998 |
| JP | 2004504630 A | 2/2004 |
| JP | 2005049417 A | 2/2005 |
| JP | 2006330100 A | 12/2006 |
| JP | 2012030980 A | 2/2012 |
| WO | 9219695 A2 | 11/1992 |
| WO | 9805998 A1 | 2/1998 |
| WO | 2010032069 A1 | 3/2010 |
| WO | 2012045973 A1 | 4/2012 |
| WO | 2013098527 A1 | 7/2013 |
| WO | 2013110564 A1 | 8/2013 |

OTHER PUBLICATIONS

International Search Report for International Application No. PCT/FR2012/053083 mailed Apr. 3, 2013, 7 pages.
International Search Report for International Application No. PCT/FR2012/053088 mailed Apr. 12, 2013, 5 pages.
International Patent Application No. PCT/FR2011/052311, International Search Report & Written Opinion mailed Jan. 17, 2012, 22 pages (includes 11 pages English translation).
International Patent Application No. PCT/FR2011/052311, English Translation of International Preliminary Report on Patentability mailed Apr. 9, 2013, 9 pages.
Chinese Patent Application No. 2011857923, English Translation of Office Action mailed Mar. 12, 2015, 17 pages.
Japanese Patent Application No. 2013532248, English Translation of Search Report mailed Apr. 24, 2015, 25 pages.
Japanese Patent Application No. 2013532248, English Translation of Office Action mailed Jun. 2, 2015, 3 pages.
Chen et al., "Electro-Optical Properties of Polymer Stabilized Cholesteric Texture Normal-Mode Light Shutter From Flexible Monomers," ALCOM Tech Report XI, 2000, pp. 223-229.
"Liquid Crystal Glass," retrieved from http://www.glazette.com/Glass-Knowledge-Bank-70/Liquid-Crystal-Glass.html on Oct. 1, 2013, 2 pages.
"Switchable Intelligent Glass—SGG Priva-lite Electrochromatic Glass," Saint Gobain Glass India, retrieved from http://n.saint-gobain-glass.com/b2c/default.asp?nav1=pr&nav2=single%20pane&id=18978 on Oct. 1, 2013, 1 page.
"Transparent Display," Kent Optronics, retrieved from http://kentoptronics.com/transparent.html on Oct. 1, 2013, 1 page.

* cited by examiner

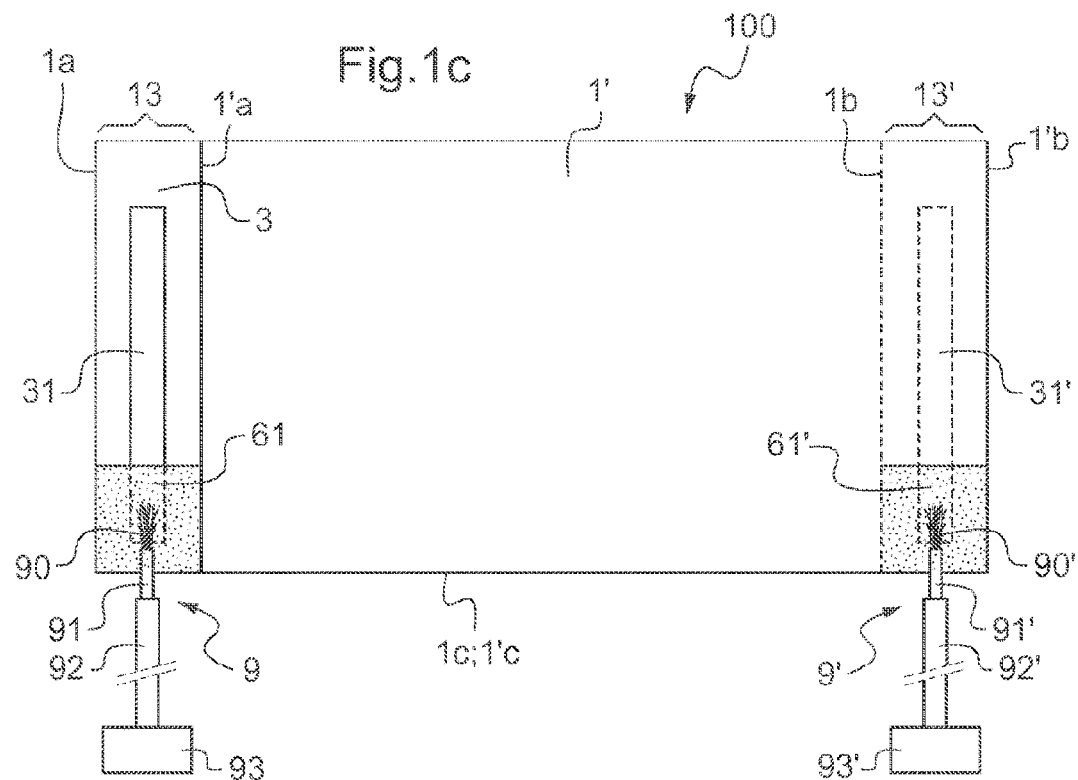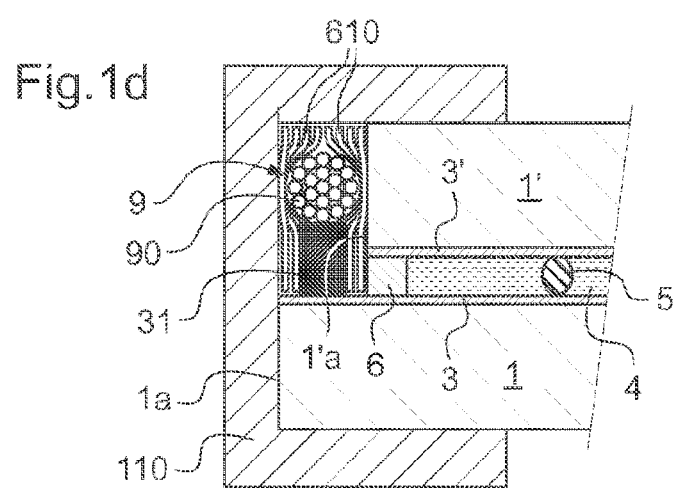

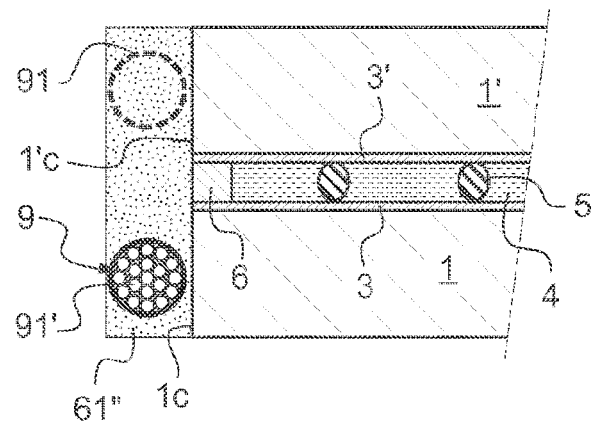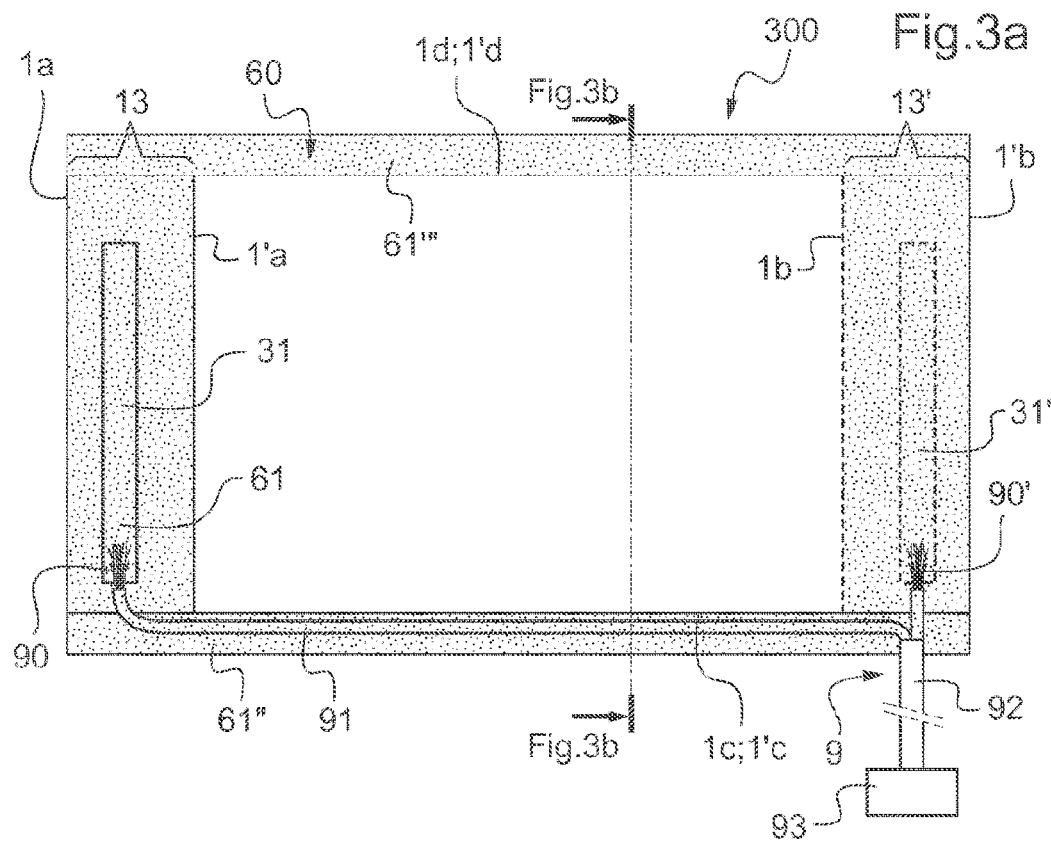

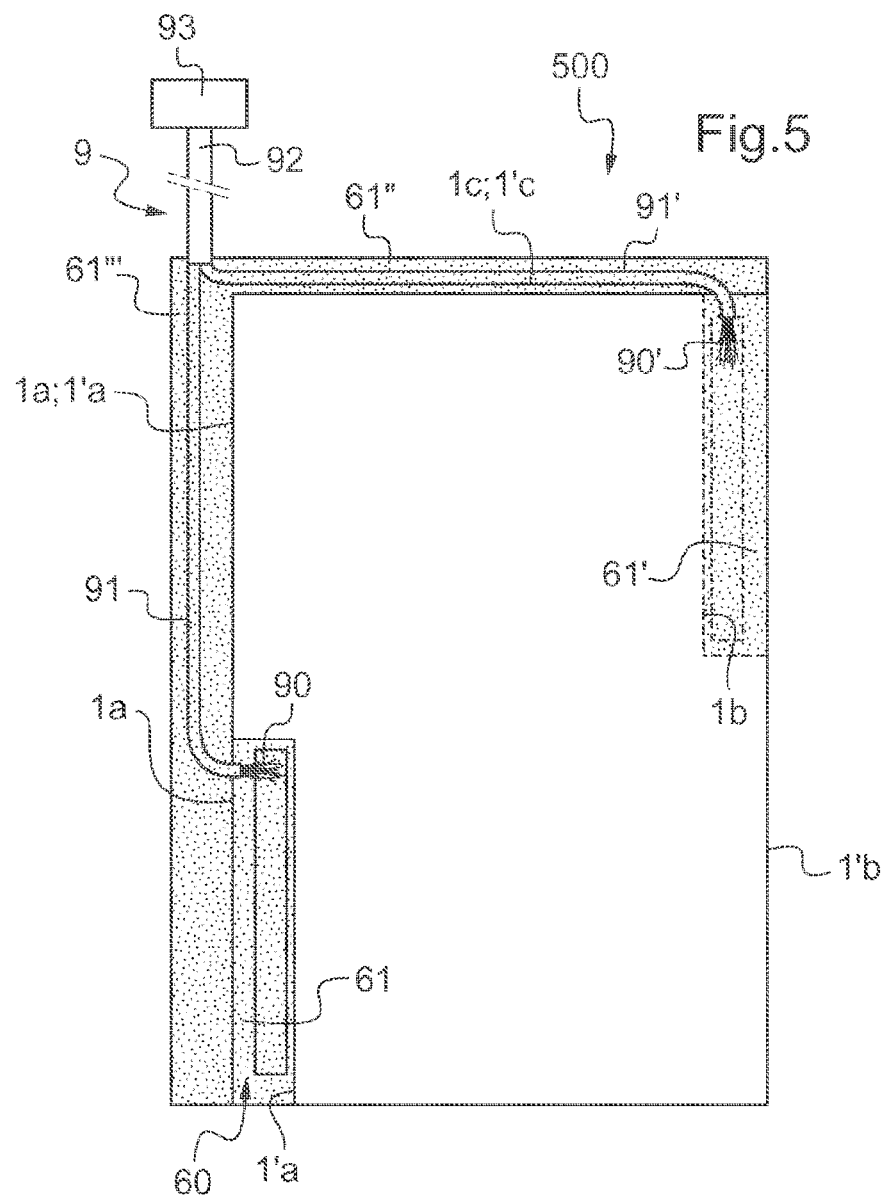

MULTIPLE GLAZING WITH VARIABLE DIFFUSION BY LIQUID CRYSTALS

CROSS-REFERENCE

This application is a 35 U.S.C. 371 national stage filing from International Application No. PCT/FR2012/053083, filed Dec. 26, 2012 and claims priority to France Application No. 1162549, filed Dec. 29, 2011. The entire contents of these applications are incorporated herein by reference.

The invention relates to the field of electrically controllable glazing with variable optical properties and more particularly relates to multiple glazing with variable liquid-crystal-induced scattering, provided with a layer of liquid crystals between two glass sheets and alternating reversibly, by application of an alternating electric field, between a transparent state and a translucent state.

Glazings are known for which certain characteristics can be modified under the effect of an appropriate electricity supply, very particularly the transmission, absorption and reflection at certain wavelengths of electromagnetic radiation, in particular in the visible and/or in the infrared, or else the scattering of light.

Electrically controllable glazing containing liquid crystals can be used everywhere, both in the construction sector and in the motor vehicle sector, whenever the view through the glazing must be prevented at given moments.

Document WO 98/05998 discloses liquid-crystal multiple glazing comprising:
- two 1 m² (float) glass sheets with thicknesses of 6 mm sealed along the side of their inner faces by an adhesive sealing gasket made of epoxy resin,
- two electrodes made of electrically conductive layers based on $SnO_2$:F directly on the inner faces of the glass sheets,
- directly on the electrodes, a 15 μm layer of PSCT-based (polymer stabilized cholesteric texture-based) liquid crystals, incorporating spacers in the form of glass beads.

During the assembly, the two glass sheets are offset leaving opposite sides of electrodes jutting out in order to facilitate the application of adhesive copper strips for delivering the current to the electrodes.

However, it is observed that this liquid-crystal multiple glazing is not necessarily long-lasting.

The objective of the present invention is to improve the reliability of the glazing with variable liquid-crystal-induced scattering, at lower cost, simply and durably.

For this purpose, the present invention provides a multiple glazing with variable liquid-crystal-induced scattering, with an edge face, the glazing having:
- a first glass sheet with a main face referred to as the first inner face and another main face referred to as the first outer face opposite the inner face and an edge referred to as the first edge,
- a second glass sheet with a main face referred to as the second inner face and another main face referred to as the second outer face (opposite the inner face) and an edge referred to as the second edge,
- the first and second glass sheets, especially float glass sheets, being held by a gasket referred to as the contact gasket,
- first and second electrodes respectively on the first and second inner faces, in the form of transparent electrically conductive layers, which first and second electrodes are provided respectively with first and second electricity supply zones,
- and, on the first and second electrodes, a layer of liquid crystals in a polymer material (or a polymer matrix), which layer of liquid crystals alternates reversibly between a transparent state and a translucent state by application of an alternating electric field, which layer has a thickness between 5 and 15 μm, including 5 μm and excluding 15 μm, and which layer incorporates spacers, preferably spherical, transparent spacers, in particular made of plastic,
- the first glass sheet protruding from one side of the second edge by a first (main) side of the first inner face, referred to as the first protruding side, and comprising the first electricity supply zone,
- electrical cabling with a first cabling input which is the core of a first cable therefore a sheathless cable zone, in the first electricity supply zone and a second cabling input which is the core of a cable, therefore a sheathless cable zone, in the second electricity supply zone,
- a first electrically insulating polymer material for electrically insulating the first cabling input, and optionally a second electrically insulating polymer material for electrically insulating the second cabling input, identical to or different from the first.

The first electrically insulating material reinforces the mechanical strength and the retention of the cabling input on the glass, and makes the liquid-crystal glazing safe. It can be mechanically protected too by a third glass sheet above the first glass sheet and protruding accordingly.

The installation of the liquid-crystal glazing is facilitated in particular when the liquid-crystal glazing is slid into a frame.

The liquid-crystal glazing is therefore both mechanically stronger and is made electrically safe.

The first electrically insulating material may preferably completely cover the first protruding side.

The diameter of the cabling input may be at least 0.3 mm, or even at least 1 mm. The width of the first protruding side may be at least 3 mm, or even at least 10 mm. The glass sheets preferably have the same shape (curved or cornered).

To further reinforce the robustness of the liquid-crystal glazing, it is sought to protect the first cable before its connection to the mains (or any other electricity supply).

Thus, in particular instead of making it run along the edge face of the glazing, the electrical cabling comprises a first electrical cable with the first cabling input and which, over at least one portion of its length located beyond the first cabling input, in particular comprising at least one sheath (the inner sheath or even the conventional outer sheath of the cable), is (placed or even solidified) along the first protruding side, optionally covered by a third glass sheet, and/or in another protruding zone of the first glass sheet or even of a third glass sheet.

This forms a cable guide and a protector.

The cable may be flush with the first sheet or be entirely on the first protruding side (or any other protruding side).

This also makes it possible to have a more compact glazing, to prevent a local overthickness.

Various cabling configurations (one or more cables) may be envisaged along a single (lateral or longitudinal) side of the glazing or over two adjacent or opposite sides of the glazing.

It may also be desired to immobilize the electrical cabling—on the first protruding side or from any other protruding side and/or against the edge of the first sheet—and prevent it from being torn out.

Therefore, the electrical cabling may comprise a first electrical cable with the first cabling input and which, over at least one portion of its length located beyond the first cabling input, comprises a sheath, in particular the inner sheath, covered with a support polymer material (or even in direct contact), which material is in particular impermeable to liquid water or even steam and/or is electrically insulating, preferably identical to or even forming the first electrically insulating material, and the sheath preferably being solidified by the support material (sheath preferably embedded in the support material).

A polymer support material is chosen that is sufficiently adherent to the sheath and adherent to the glass, for example a thermoplastic.

EVA, standing for ethylene/vinyl acetate copolymer, has, for example, a good adhesion to the glass and to a sheath made of polyvinyl chloride (PVC) unlike a fluorinated (Teflon, etc.) sheath.

This polymer support material may be an adhesive. Silicone may also be chosen.

The thickness of the polymer support material is, for example, substantially equal to the diameter of the cable, for example of the order of 5 mm, especially if the cable is along the edge face of the glazing.

If a length of electrical cabling is against the edge face of the glazing, the support material fixes this length of cabling against the edge face.

If a length of electrical cabling is on the first protruding side (or on any other protruding side), this support material may completely fill the protruding side at least over the portion thereof more external than the cable.

This support material also improves the mechanical strength and the positioning of the cable, facilitates installation of the glazing especially when the glazing is slid into a frame.

Preferably, the cabling is covered all along the glazing by this material (before the exit thereof for connection to the mains).

It is also possible to hide the cabling by the support material chosen to be opaque, for example milky white, by addition if necessary of additives to the support material.

Advantageously, the electrical cabling may comprise a first electrical cable with the first cabling input and fixed in a given unidirectional, in particular linear, position, in particular along the edge face or the first protruding side of the glazing, leaving the glazing or even starting from outside of the first cabling input with the first electrically insulating material.

The unidirectional character may be facilitated:
by the first electrically insulating material which may initiate a favored direction from the cabling input zone, and/or by the support material that solidifies the cable, and/or its placement onto the first protruding side.

It is thus preferred not to form a U shape (and preferably an L shape) even after a connection to the general electricity supply (mains, etc.).

This thus prevents any deterioration of the cable by bending, during transport, or installation, and also deinstallation (repair, etc.).

Therefore, in a first unidirectional configuration, the electrical cabling comprises a (single) first cable, the input of which is level with the side capable of being, after assembly of the glazing, the upper or respectively lower side (position relative to the ground) of the glazing, starting from outside of the first cabling input with the first electrically insulating material, this first cable is unidirectional, toward the (general) electricity supply, in particular toward the ceiling or floor, respectively.

Therefore, in a second unidirectional configuration (alternative or cumulative), the electrical cabling comprises a (single) first cable, the input of which is level with the side capable of being, after assembly of the glazing, the lateral side of the glazing, starting from outside of the first cabling input with the first electrically insulating material, the cable is unidirectional.

In cornered glazing, the lateral side is vertical after assembly, and may be either longer, equal to or shorter than the horizontal side.

Preferably, the cable follows a single side.

To simplify the connection, the electrical cabling may preferably exit from the glazing, in particular without coverage by the first electrically insulating material, in a single zone, especially a zone of a single side of the edge face, and preferably the cabling consists of a single first electrical cable which is a two-wire cable.

To extend the electrical and mechanical protection of the glazing, the first electricity supply zone may comprise a first current feed to which the first cabling input is attached and which is protected by the first electrically insulating material.

The first current feed (commonly referred to as a busbar) is for example an electrically conductive strip in the form of a flexible copper foil attached to the first electrode along the side.

To further improve the reliability of the glazing, it may comprise a seal impermeable to liquid water or even to steam, in particular outside of the contact gasket and formed by an impermeable polymer material, in particular that is electrically insulating, the impermeable seal being arranged for the impermeability of the first cabling input and preferably of an optional first current feed, and (over all or some) of the first electrode in particular in the zone exterior to the sealing gasket.

The impermeable polymer material according to the invention adheres sufficiently to the glass sheets. It is not necessary either to add (thin) tie layer(s) to the surface of glass sheet(s) to strengthen the adhesion.

The impermeable polymer material therefore guarantees the impermeability to liquid water, or even to steam, in particular very strict impermeability in wet environments (bathroom, etc.).

As applications in a wet (floodable, etc.) zone, mention may be made of:
a wet room (separate or being part of a bedroom or any other room), a laundromat, a laundry room, in a bathroom, a shower, in particular as floor, wall, partition, door (optionally sliding), facade window or internal window,
a swimming pool, (floor) tile, wall, window, changing room,
a building facade (store window, window, especially a street-level or garden-level window) in floodable zones, etc.,
road, municipal or coastal signage glazing, in floodable zones etc., in a road close to or by the sea, a river, a stream, etc.,
a boat.

In a preferred design, the impermeable material also forms the first electrically insulating material.

The impermeable seal may be along at least one side of the first edge face and/or along the first protruding side.

Preferably, the seal that is impermeable to liquid water, or even to steam, is also arranged for the impermeability of the second cabling input, and preferably of an optional current feed of the second electrode and (over all or part) of the second electrode in the zone exterior to the sealing gasket.

In one advantageous design, in order to guarantee the complete impermeability of the liquid-crystal glazing, the water-impermeable seal is over the entire perimeter of the glazing and in particular:

is against the edge face of the glazing, in particular for a protection of the corners of glass sheet(s), and/or is along the first protruding side, in particular to prevent a local overthickness (and a thickness of seal over the edge face).

The water-impermeable seal may border, or even optionally cover the electrical cabling, it being possible in particular for the impermeable material to be the support material already mentioned, in particular EVA.

The glazing is in particular provided with the water-impermeable seal may be free of an external, in particular opaque, surround (rigid frame, bead, joinery, etc.).

The water-impermeable seal may provide a satisfactory finish, necessary for edge-to-edge glazing installation and installations of the glazing in doors. Furthermore, the seal may dampen shocks, in particular protecting the corners of the glazing.

A transparent impermeable material, such as for example EVA, may be preferred, especially if the seal is visible, for example in door applications.

The width (cross section) of the seal that is impermeable to liquid water is not necessarily identical over the entire perimeter.

For the first electrically insulating material and/or the impermeable material and/or a support material for the electric cabling, a material that adheres to the glass is chosen, for example a thermoplastic.

The first electrically insulating material and/or the impermeable material of the seal which optionally forms the first electrically insulating material and/or the support material for the electric cabling may advantageously be transformed (that is to say shaped, in particular by softening, adhesive bonding, liquefaction and preferably crosslinking) via a thermal cycle, in particular in an oven or by simple heating. This transformation is preferable:

to an extrusion, complicated to implement in production with no guarantee of adhesion to the glass, or else to the use of a hot-melt adhesive applied hot with a gun, with no guarantee of adhesion to the glass.

The first electrically insulating material may be made of ethylene/vinyl acetate (moldable material) or else of silicone, in particular to provide impermeability to liquid water or even steam.

The first electrically insulating material may also finally be made of thermosetting resin, in particular epoxy resin, preferably using the same material as the contact gasket and also providing impermeability to liquid water, or even steam.

The first electrically insulating material may be made of polyurethane or polystyrene (which are moldable) or else of polyvinyl butyral or ionomer resin, without however providing a water-impermeability function.

It is also possible to choose all these materials (ethylene/vinyl acetate, silicone, epoxy resin, polyurethane, polystyrene, polyvinyl butyral, ionomer resin) for the support material of the electric cabling.

Preferably, the impermeable material which optionally forms the first electrically insulating material and/or which optionally forms a support material for the electric cabling is crosslinked, in particular to form a three-dimensional network in order to reinforce the impermeability to liquid water, or even steam.

Preferably, the first electrically insulating material and/or the impermeable material and/or a support material for the electric cabling may be made of silicone or based on ethylene/vinyl acetate, in particular crosslinked by agents such as organic peroxide.

EVA in particular adheres well to the glass as already indicated.

The first electrically insulating material and/or the impermeable material of the seal which optionally forms the first electrically insulating material and/or a support material for the electric cabling may have a surface, referred to as the outer surface, oriented toward the outside of the glazing, which is molded.

The external surface may be flat, smooth or intentionally grooved, or serrated. It may form a profile, in particular to reduce the amount of material used, by being curved toward the outside for example.

The first protruding side may be obtained by offsetting the first and second edge faces or by partial cutting of the second edge face.

The second glass sheet may protrude over an edge face side of the first glass sheet by a side of the second inner face referred to as the other protruding side, comprising the second electricity supply zone, and the glazing comprises a second electrically insulating polymer material for electrically insulating the second cabling input, identical to or different from the first electrically insulating material.

The first protruding side may extend over a limited portion of the first side of the first inner face, the protrusion being obtained by partial cutting of the second edge face. And preferably the second glass sheet may protrude over one side of the first edge face, by a side of the second inner face referred to as the other protruding side, comprising the second electricity supply zone, and extending over a limited portion of one side of the second inner face, the protrusion being obtained by partial cutting of the first edge face, and preferably the first protruding side and the other protruding side are on one and the same side of the glazing.

The liquid-crystal glazing is thus further simplified by forming first and second electricity supply zones that are close together and/or in addition this may limit the length of cabling necessary. However enough space is left between them to prevent connections, for example soldered connections, between cable inputs and external parts from becoming hot.

Preferably, the ends of the first and second cabling inputs are spaced apart by a length, referred to as a separation length, measured along the main plane of the glazing, which is greater than or equal to 10 cm, or even greater than or equal to 15 cm, in particular less than 30 cm.

For example, in order to bring together the cabling inputs and the optional current feeds on the same side of the cornered (rectangular, square etc.) glazing, each of the first and second glass sheets is cut over half of the width of this side.

Furthermore, the spacers may preferably be made of a transparent plastic. The spacers (roughly) determine the thickness of the layer of liquid crystals. For example, spacers made of polymethyl methacrylate (PMMA) are preferred.

The spacers are preferably made of a material having an optical index (substantially) equal to the optical index of (the matrix of) the layer of liquid crystals.

The layer of liquid crystals may be based on liquid crystals of various types.

For the liquid crystals, use may specifically be made of all the liquid-crystal systems known under the terms NCAP (Nematic Curvilinearly Aligned Phases) or PDLC (Polymer Dispersed Liquid Crystal) or CLC (Cholesteric Liquid Crystal) or NPD-LCD (Non-homogeneous Polymer Dispersed Liquid Crystal Display).

These may in addition contain dichroic dyes, in particular in solution in the liquid-crystal droplets. It is then possible to jointly adjust the light scattering and the light absorption of the systems.

It is also possible to use, for example, gels based on cholesteric liquid crystals that contain a small amount of crosslinked polymer, such as those described in patent WO 92/19695. More broadly, PSCT (Polymer Stabilized Cholesteric Texture) systems can therefore be chosen.

In particular, use may be made of bistable smectic liquid crystals, for example as explained in detail in patent EP 2 256 545, which switch under the application of an alternating electric field in pulsed form and which remain in the switched state until the application of a new pulse.

The liquid-crystal system may be discontinuous, in several pieces (for example of pixel type).

In the wet zones as elsewhere, the glazing according to the invention may (also) be used:
- as an internal partition (between two rooms or in a space) in a building, in a land-based aerial or nautical means of transportation (between two compartments, in a taxi, etc.),
- as a glazed door, a window, a ceiling or tiling (floor, ceiling),
- as a side window or roof of a land-based, aerial or nautical means of transportation,
- as a projection screen,
- as a store window or display case, in particular of a counter.

Furthermore, by reducing the thickness of the layer (and hence the amount of active mixture encapsulated) below 15 μm, the cost of material is reduced.

Naturally, the glazing according to the invention may form all or part of a partition and other window (transom, etc.).

Figure 1B:
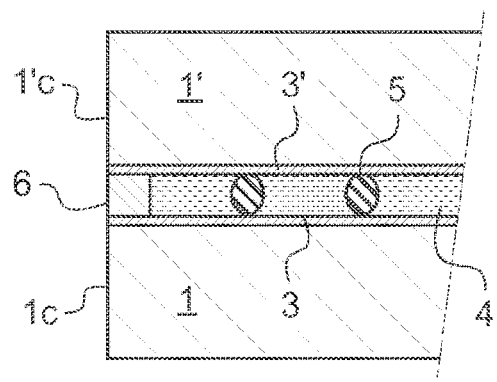
Figure 2A:
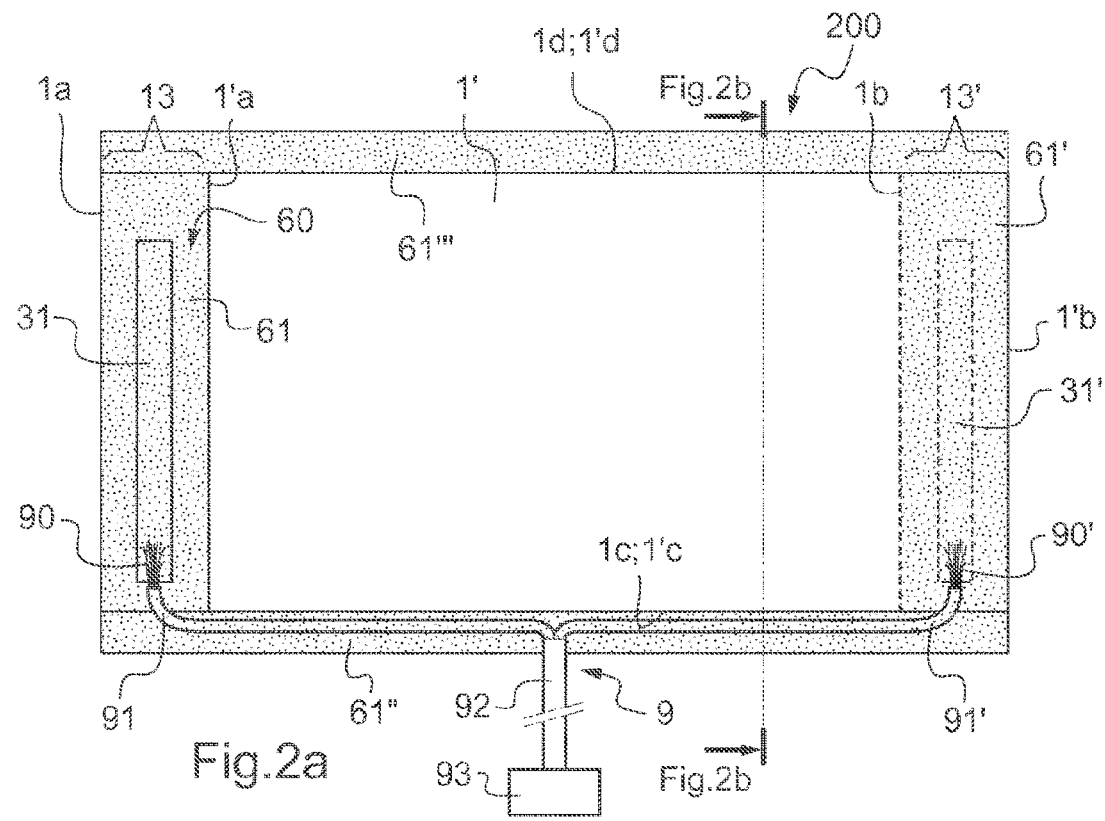
Figure 2B:
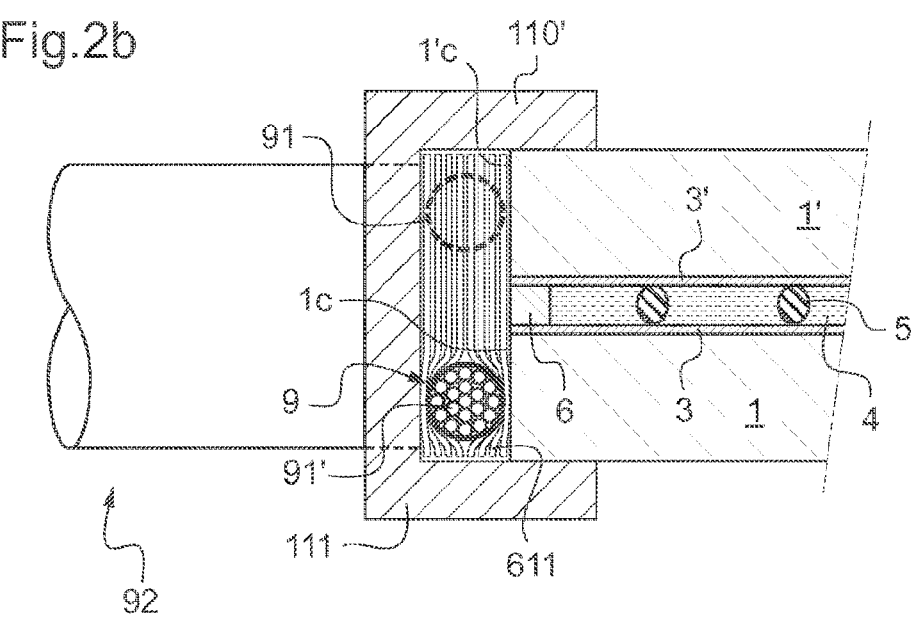
Figure 3B:
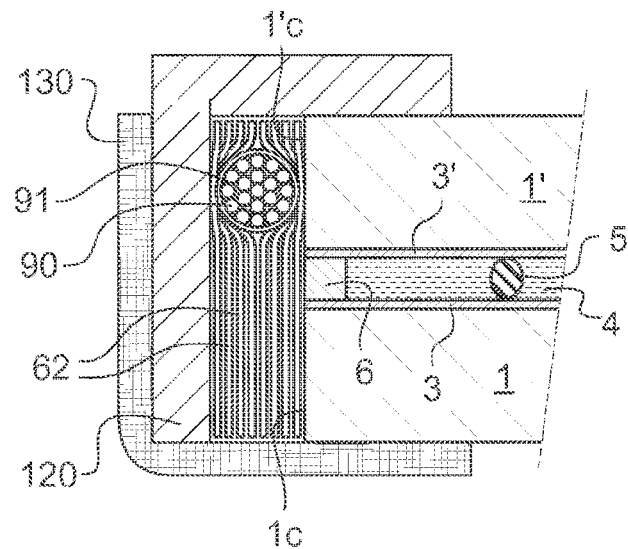
Figure 3C:
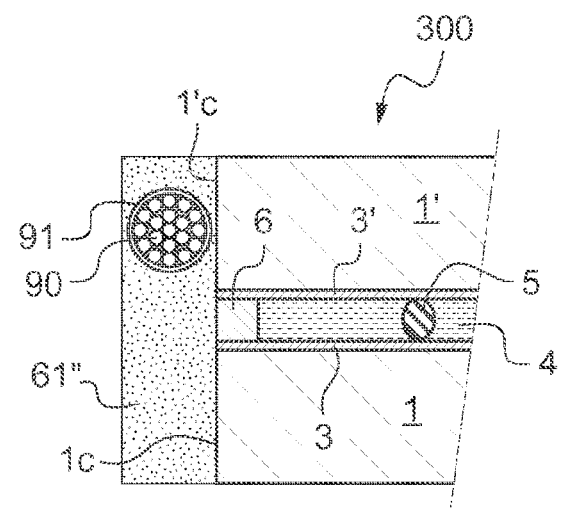
Figure 4A:
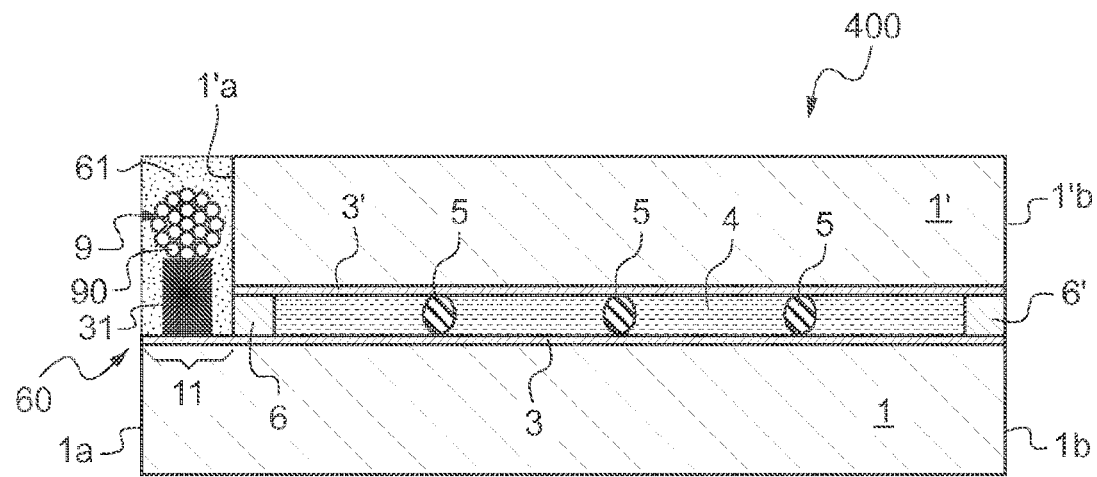
Figure 4B:
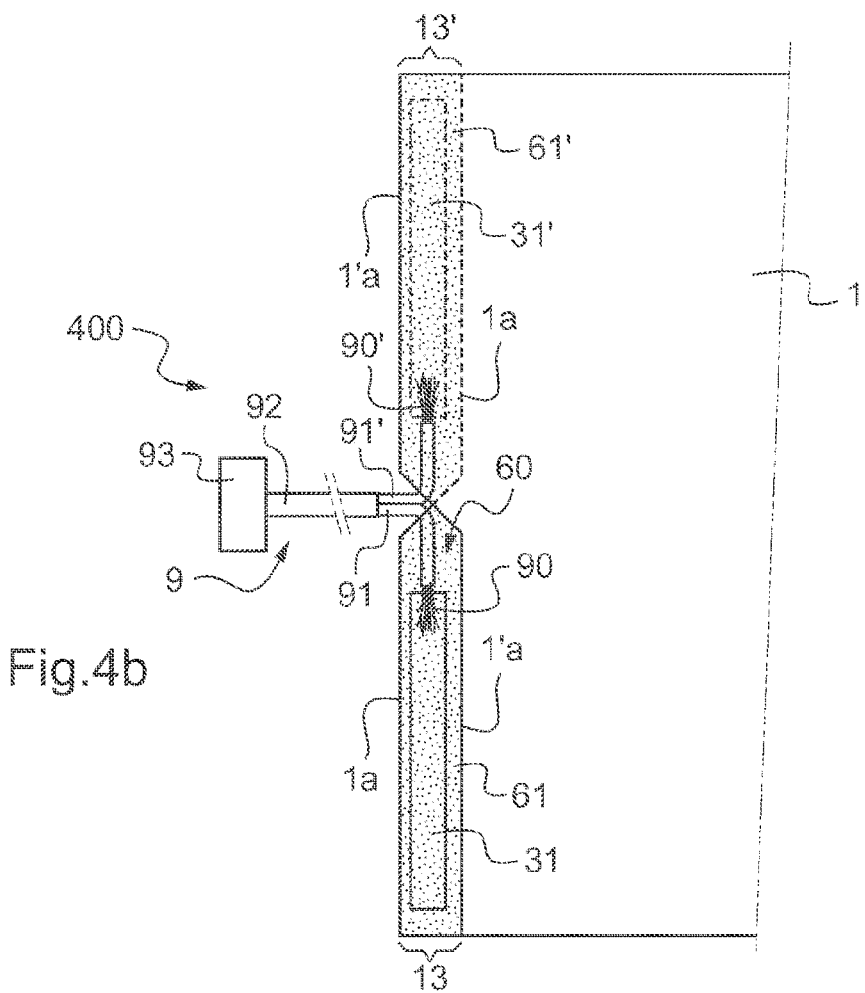

Other details and features of the invention will become clear from the detailed description that follows, given with regard to the appended drawings in which:

FIG. 1a represents a schematic cross-sectional view of a first embodiment of the multiple glazing with variable liquid-crystal-induced scattering according to the invention, FIG. 1b represents a partial and schematic cross-sectional view of the multiple glazing with variable liquid-crystal-induced scattering from FIG. 1, FIG. 1c represents a schematic top view of the multiple glazing with variable liquid-crystal-induced scattering from FIG. 1a, FIG. 1d represents a partial and schematic cross-sectional view of the multiple glazing with variable liquid-crystal-induced scattering from FIG. 1a during manufacture, FIG. 2a represents a schematic top view of a second embodiment of the multiple glazing with variable liquid-crystal-induced scattering according to the invention, FIG. 2b represents a schematic and partial cross-sectional view of the multiple glazing with variable liquid-crystal-induced scattering from FIG. 2a during manufacture, FIG. 2c represents a schematic and partial cross-sectional view of the multiple glazing with variable liquid-crystal-induced scattering from FIG. 2a, FIG. 3a represents a schematic top view of a third embodiment of the multiple glazing with variable liquid-crystal-induced scattering according to the invention, FIG. 3b represents a schematic and partial cross-sectional view of the multiple glazing with variable liquid-crystal-induced scattering from FIG. 3a during manufacture, FIG. 3c represents a schematic and partial cross-sectional view of the multiple glazing with variable liquid-crystal-induced scattering from FIG. 3a, FIG. 4a represents a schematic cross-sectional view of a fourth embodiment of the multiple glazing with variable liquid-crystal-induced scattering according to the invention, FIG. 4b represents a schematic and partial top view of the multiple glazing with variable liquid-crystal-induced scattering from FIG. 4a, FIG. 5 represents a schematic top view of a fifth embodiment of the multiple glazing with variable liquid-crystal-induced scattering according to the invention.

For the sake of clarity it is specified that the various elements of the objects represented are not necessarily reproduced to scale.

FIG. 1 represents a schematic cross-sectional view of a first embodiment of the multiple glazing with variable liquid-crystal-induced scattering according to the invention with:
- a first glass sheet 1 that is rectangular—defining four sides—, with one face referred to as the first inner face 11 and another face referred to as the first outer face 12 and an edge referred to as the first edge 1a to 1d,
- a second glass sheet that is rectangular—defining four sides—, with one face referred to as the second inner face 11' and another face referred to as the second outer face 12' and an edge referred to as the second edge 1'a to 1'd.

The first glass sheet 1 protrudes from one side of the second edge 1'a, via a first side 13 of the first inner face 11, referred to as the first protruding side 13. For example, it is a first lateral (or as a variant longitudinal) side.

The second glass sheet 1' protrudes from an edge side of the first glass sheet 1b, via one side of the second inner face referred to as the other protruding side 13'. For example, it is the second lateral (or as a variant longitudinal) side.

The first protruding side 13 and the other protruding side (here opposite) are obtained by offsetting the first and second edges 1a, 1'a.

The sides 1c, 1'c and the opposite sides 1d, 1'd are shown in FIG. 1c.

Positioned on each of the first and second sheets of float glass 1 and 1', on the inner faces 11, 11', is an electrically conductive layer 3, 3' having a thickness of around 20 to 400 nm, made from indium tin oxide (ITO) for example. The ITO layers have an electrical surface resistance between 5Ω/□ and 300Ω/□. Instead of layers made of ITO, it is also possible to use, for the same purpose, other electrically conductive oxide layers or silver layers, the surface resistance of which is comparable.

The layer 4 of liquid crystals, which may have a thickness of around 5 to 14 μm, is located between the electrode layers 3 and 4.

The layer 4 of liquid crystals contains spherical spacers 5. The spacers 5 consist of a transparent polymer. By way of example, the product from Sekisui Chemical Co., Ltd., known under the name Micropearl SP has proved very suitable as a spacer, made of polymethyl methacrylate (PMMA).

Furthermore, for the layer of liquid crystals, it is also possible to use known compounds, for example the compounds described in document U.S. Pat. No. 5,691,795. The liquid-crystal compound from Merck Co., Ltd., sold under the trade name Cyanobiphenyl Nematic Liquid Crystal E-31 LV has also proved to be particularly suitable. In the case of this embodiment, this product is mixed in a ratio of 10:2 with a chiral substance, for example 4-cyano-4'-(2-methyl)butyl-biphenyl, and this mixture is mixed in the ratio of 10:0.3 with a monomer, for example 4,4'-bisacryloylbiphenyl, and with a UV initiator, for example benzoin methyl ether. The mixture thus prepared is applied to one of the coated glass sheets. After curing the layer of liquid crystals by irradiation with UV light, a polymer network is formed in which the liquid crystals are incorporated.

For the layer of liquid crystals, it is possible to use PDLCs such as the compound 4-((4-ethyl-2,6-difluoro-phenyl)ethynyl)-4'propylbiphenyl and 2-fluoro-4,4'-bis(trans-4-propyl-cyclohexyl)biphenyl for example sold by Merck under the reference MDA-00-3506.

The layer chosen for production is one 10 µm thick, more particularly a PDLC layer.

Over the side, a contact gasket 6 is used at the same time to join the glass sheets 1, 1' provided with electrodes 3, 3' in a firm and permanent manner. The contact gasket is made of epoxy resin.

In addition, this glazing 100 comprises first and second electricity supply zones:

for a first current feed, a first electrically conductive strip 31 in the form of a flexible copper foil (commonly referred to as a busbar) attached to the first electrode, along the first protruding side 13, for a second current feed, a second electrically conductive strip 31' in the form of a flexible copper foil attached to the second electrode, along the other protruding side.

The glazing 100 then comprises electrical cabling with two cables 9, 9' and therefore two cabling inputs: a first cabling input 90 which is a sheathless core of a first cable 9 welded to the first current feed 31 and a second cabling input 90' which is the sheathless core of a second cable 9' welded to the second current feed 31'.

The first cabling input 90 is insulated by an electrically insulating polymer material 61, here chosen to be EVA.

The second cabling input 90' is insulated by an electrically insulating polymer material 61', here chosen to be EVA.

As shown in FIG. 1b, along the two other adjacent sides, all the edges of the glass sheets are aligned.

The first cabling input 90 is fixed in a given unidirectional, in particular linear, position, leaving the glazing or even starting from outside of the first cabling input 90 with the first electrically insulating material 91.

First and second cables 9, 9', for example having cores 90, 90' with a cross section equal to 0.6 mm$^2$ and a total diameter with the inner sheath 91, 91' of 2 mm are chosen. The total diameter with the outer sheath 92, 92' is 5.5 mm. The cables are connected to the mains 93, 93' while exiting the glazing 100.

As shown in FIG. 1d, the electrical insulation of the first cabling input 90 (respectively of the second cabling input 90) the thermoplastic polymer material made of EVA which is preferably crosslinkable 610 by agents such as organic peroxide, in the form of strips—or as a variant beads—, is used. The width of the strips depends on the thickness of the glass sheets used. For example, strips of EVA having a thickness of 0.4 mm are placed in order to cover the first input of the stripped cable 90 (respectively the second input 90').

Use is then made of a mold 110 having an inner surface referred to as a molding surface. The mold 110, having a (substantially) C-shaped cross section, is:

pressed against the glazing by the main outer faces;

butted up against the edge face of the glass sheet 1a, or as a variant with a space in order to cover the edge face 1a with molded EVA (by possible steps internal to the mold).

The mold 110 has an (inner) molding surface to which EVA does not appear, for example made of Teflon.

The mold 110 is open laterally on one side to allow the first cable 9 to exit. In order to contain the EVA, the lateral sides of the mold are closed off or obstructed, in particular with fabric or adhesive tape (not shown).

The mold 110, as a variant, has a side wall that is pierced to allow the first cable to exit.

For the second cabling input 90', a similar molding part is used and the same procedure is followed.

The assembly of glazing and mold(s) is placed in a simple vacuum-sealed chamber which is pumped to a rough vacuum in order to degas the EVA (removal of bubbles, etc.) and heated above 100° C. to fluidize the EVA polymer material so that the EVA material adopts the molding surface and in order to start the crosslinking of the EVA.

With this EVA, the means of impermeability to liquid water of the first and second cabling inputs 90, 90' is formed at the same time. As shown in FIG. 1c, the EVA is not present outside of these zones.

FIG. 2a represents a schematic top view of a second embodiment of the multiple glazing with variable liquid-crystal-induced scattering 200 according to the invention.

The glazing 200 differs from the glazing 100 firstly by the formation of a seal that is impermeable to liquid water made of EVA encircling the glazing, impermeability to liquid water:

of the first current feed 31 and of the first electrode in this supply zone, seal 61 filling the whole of the first protruding side (over the entire length and over the width), of the second current feed 31' and of the second electrode in this supply zone, seal 61' filling the whole of protruding edge 13 (over the entire length and over the width), of a first longitudinal side, seal 61" along the edge face of the glazing 1c (see also FIG. 2c), of a second longitudinal side, seal 61''' along the edge face of the glazing 1d.

In addition, the cabling 9 comprises a single two-wire cable 90, 90' along the first longitudinal side of the glazing 200. The EVA immobilizes the two inner sheaths 91, 91'. The electrical cable is fixed in a given unidirectional, linear position on exiting the glazing. The cable exits the glazing, in a single zone before connection to the mains 93.

The molded EVA 61 has a smooth outer surface.

The impermeability to liquid water is qualified by determining the second figure of the protection index (IP).

The protection index (IP) is an international standard of the Internal Electrotechnical Commission. This index classifies the level of protection that a material offers against the ingress of solid and liquid bodies. The format of the index, given by the standard CEI 60529, is IP XY, where the second figure Y relates to the level of protection against water under the conditions summarized in Table 1 below.

TABLE 1

| Index | 2$^{nd}$ figure for protection against water |
|---|---|
| 0 | No protection |
| 1 | Protected against water droplets falling vertically |
| 2 | Protected against water droplets falling at up to 15° from the vertical |
| 3 | Protected against rain at up to 60° from the vertical |
| 4 | Protected against discharges of water from all directions |
| 5 | Protected against jets of water from all directions from hoses |
| 6 | Protected against large waves |
| 7 | Protected against the effects of immersion |

This coefficient is defined for example in standards DIN40050, IEC 529, BS 5490.

This glazing 200 meets the IPX7 standard, that is to say that the glazing has been shown to operate while completely immersed in water (test described by the standard IEC 60335-1:2002). The immersion is temporary and at a depth of between 0.15 m and 1 m. More specifically, the test was carried out by completely immersing the glazing in water in its manufacture-recommended installation configuration, so that the following conditions are respected:
 a) the glazing was horizontal at a depth of 1 m and supplied with electrical power,
 b) the test lasted for 30 min,
 c) the temperature of the water did not differ from that of the glazing by more than 5 K.

The embedded cable inputs 90, 90' are also stronger. The resistance of the cable to being torn out can be established by the following method.

The cable is marked where it exits the mold and it is subjected to a tensile force of 100 N (10 kg) at a distance of around 20 mm from the cable input. The cable is subjected to a tensile force of 100 N for 1 s without jolting in the least favorable direction. The test is carried out 25 times. Next the cable is subjected to a torsion torque of 0.35 N·m applied as close as possible to the input of the glazing for 1 min. During the tests, the cable must not be damaged, that is to say severed by the torque. The tensile force is again applied and the longitudinal displacement of the cable must not be more than 2 mm.

FIG. 2b represents a schematic and partial cross-sectional view of the multiple glazing with variable liquid-crystal-induced scattering from FIG. 2a during manufacture.

The mold 110' differs from the mold 100 in that it encircles the entire perimeter of the glazing and as many strips of EVA as necessary and strips of EVA 611 are placed along the longitudinal edges in the space between the molding surface and the edge faces 1c, 1'c.

The mold 110' is also pierced with one or more holes 111 on its wall opposite the edge face of the glazing to allow the cable to exit.

FIG. 3a represents a schematic top view of a third embodiment of the multiple glazing with variable liquid-crystal-induced scattering 300.

The glazing 300 differs from the glazing 200 in the positioning of the two-wire cable and its connection to the mains 93 over a corner. As shown in FIG. 3b, the manufacturing process presented differs from the second embodiment in that the mold 120 of L-shaped cross section is open and is therefore only on one side of the main outer face of the sheet 1'. A cover 130 (strip of adhesive-coated fabric for example or strip of fabric attached by adhesive tape) is positioned on one side of the main outer face of the sheet 1 and extends over the mold 120 so as to cap it.

FIG. 4a represents a schematic cross-sectional view of a fourth embodiment of the multiple glazing 400 with variable liquid-crystal-induced scattering according to the invention.

The glazing 400 differs from the glazing 100 in that the first protruding side 13 is obtained by partial cutting of the second edge face 1'a and the other protruding side 13' is obtained by partial cutting of the first edge face 1a.

The first protruding side 13 and the other protruding side 13' are on a single longitudinal side as shown in FIG. 4b.

These sides 13, 13' are completely covered by EVA 61, 61', protecting current feeds and cabling inputs. Connection to the mains 93 is in the middle.

FIG. 5 represents a schematic top view of a fifth embodiment of the multiple glazing 500 with variable liquid-crystal-induced scattering according to the invention.

The glazing 500 differs from the glazing 100 in that the first protruding side 13 is obtained by partial cutting of the second edge face 1'a and the other protruding side 13' is obtained by partial cutting of the first edge face 1a.

The first protruding side 13 and the other protruding side 13' are on longitudinal sides 1a, 1'b and are not opposite each other.

These sides 13, 13' are completely covered by EVA 61, 61'. Connection to the mains 93 is in the middle.

The cabling is a single two-wire cable 9 immobilized by EVA 61", 61'" against the edge face of the first longitudinal side and of a second lateral side 1c, 1'c.

The invention claimed is:

1. A multiple glazing with variable liquid-crystal-induced scattering, with an edge face, the multiple glazing having:
 a first glass sheet with a face referred to as a first inner face and another face referred to as a first outer face and an edge referred to as a first edge,
 a second glass sheet with a face referred to as a second inner face and another face referred to as a second outer face and an edge referred to as a second edge,
 a gasket positioned between the first and second glass sheets that joins the first and second glass sheets together,
 first and second electrodes respectively on the first and second inner faces, in the form of transparent electrically conductive layers, which first and second electrodes are provided respectively with first and second electricity supply zones,
 and, on the first and second electrodes, a layer of liquid crystals in a polymer material, the liquid crystals being configured to alternate reversibly between a transparent state and a translucent state by application of an alternating electric field,
 the first glass sheet protruding from one side of the second edge by a first side of the first inner face, referred to as the first protruding side, and comprising the first electricity supply zone,
 electrical cabling with a first cabling input in the first electricity supply zone and a second cabling input in the second electricity supply zone, and
 a first electrically insulating polymer material covering the electrical cabling at least within the first electricity supply zone.

2. The multiple glazing with variable liquid-crystal-induced scattering as claimed in claim 1, characterized in that the electrical cabling comprises a first electrical cable with the first cabling input, wherein the first electrical cable is positioned along at least one of the first protruding side and in another protruding zone of the first glass sheet over at least one portion of its length located beyond the first cabling input.

3. The multiple glazing with liquid-crystal-induced variable scattering as claimed in claim 1, characterized in that the electrical cabling comprises a first electrical cable with the first cabling input, wherein the first electrical cable comprises a sheath over at least a portion of its length, and the first electrically insulating polymer material covers at least a portion of the first electrical cable surrounded by the sheath.

4. The multiple glazing with variable liquid-crystal-induced scattering as claimed in claim 1, characterized in that the electrical cabling comprises a first electrical cable with the first cabling input, wherein the first electrical cable is fixed in a given unidirectional position at a location leaving the glazing with the first electrically insulating material.

5. The multiple glazing with variable liquid-crystal-induced scattering as claimed in claim 4, characterized in that the electrical cabling leaves the glazing in a single zone.

6. The multiple glazing with variable liquid-crystal-induced scattering as claimed in claim 1, characterized in that the first electricity supply zone comprises a first current feed to which the first cabling input is attached and which is protected by the first electrically insulating material.

7. The multiple glazing with variable liquid-crystal-induced scattering as claimed in claim 1, further comprising a seal impermeable to water, the seal being formed by an impermeable polymer material that is electrically insulating, wherein the seal is arranged to provide impermeability of at least the first cabling input.

8. The multiple glazing with variable liquid-crystal-induced scattering as claimed in claim 7, characterized in that the impermeable polymer material forms the first electrically insulating polymer material.

9. The multiple glazing with variable liquid-crystal-induced scattering as claimed in claim 7, characterized in that the seal is along at least one of the first edge and the first protruding side.

10. The multiple glazing with variable liquid-crystal-induced scattering as claimed in claim 7, characterized in that the seal is over an entire perimeter of the glazing and the seal borders the electrical cabling.

11. The multiple glazing with variable liquid-crystal-induced scattering as claimed in claim 7, characterized in that the impermeable polymer material is crosslinked.

12. The multiple glazing with variable liquid-crystal-induced scattering as claimed in claim 11, characterized in that at least one of the first electrically insulating material, the impermeable polymer material, and a support material for the electrical cabling is formed of crosslinked ethylene/vinyl acetate.

13. The multiple glazing with variable liquid-crystal-induced scattering as claimed in claim 11, characterized in that at least one of the first electrically insulating material, the impermeable polymer material, and a support material for the electrical cabling is made of silicone.

14. The multiple glazing with variable liquid-crystal-induced scattering as claimed in claim 7, characterized in that at least one of the first electrically insulating material, the impermeable polymer material, and a support material for the electrical cabling has a surface referred to as the outer surface, oriented toward an outside of the glazing, which is molded.

15. The multiple glazing with variable liquid-crystal-induced scattering as claimed in claim 7, wherein the seal is further arranged to provide impermeability of the first current feed and of the first electrode.

16. The multiple glazing with variable liquid-crystal-induced scattering as claimed in claim 1, characterized in that the first protruding side is obtained by one of offsetting the first and second edge faces and by partial cutting of the second edge face.

17. The multiple glazing with variable liquid-crystal-induced scattering as claimed in claim 1, characterized in that the first protruding side extends over a limited portion of the first side of the first inner face, the protrusion being obtained by partial cutting of the second edge face and in that the second glass sheet protrudes over one side of the first edge face, by a side of the second inner face referred to as the other protruding side, comprising the second electricity supply zone, and extending over a limited portion of one side of the second inner face, the other protrusion being obtained by partial cutting of the first edge face, and the first protruding side and the other protruding side are on one and the same side of the glazing.

18. The multiple glazing with variable liquid-crystal-induced scattering as claimed in claim 1, further comprising a second electrically insulating polymer material for electrically insulating the second cabling input.

* * * * *